UNITED STATES PATENT OFFICE.

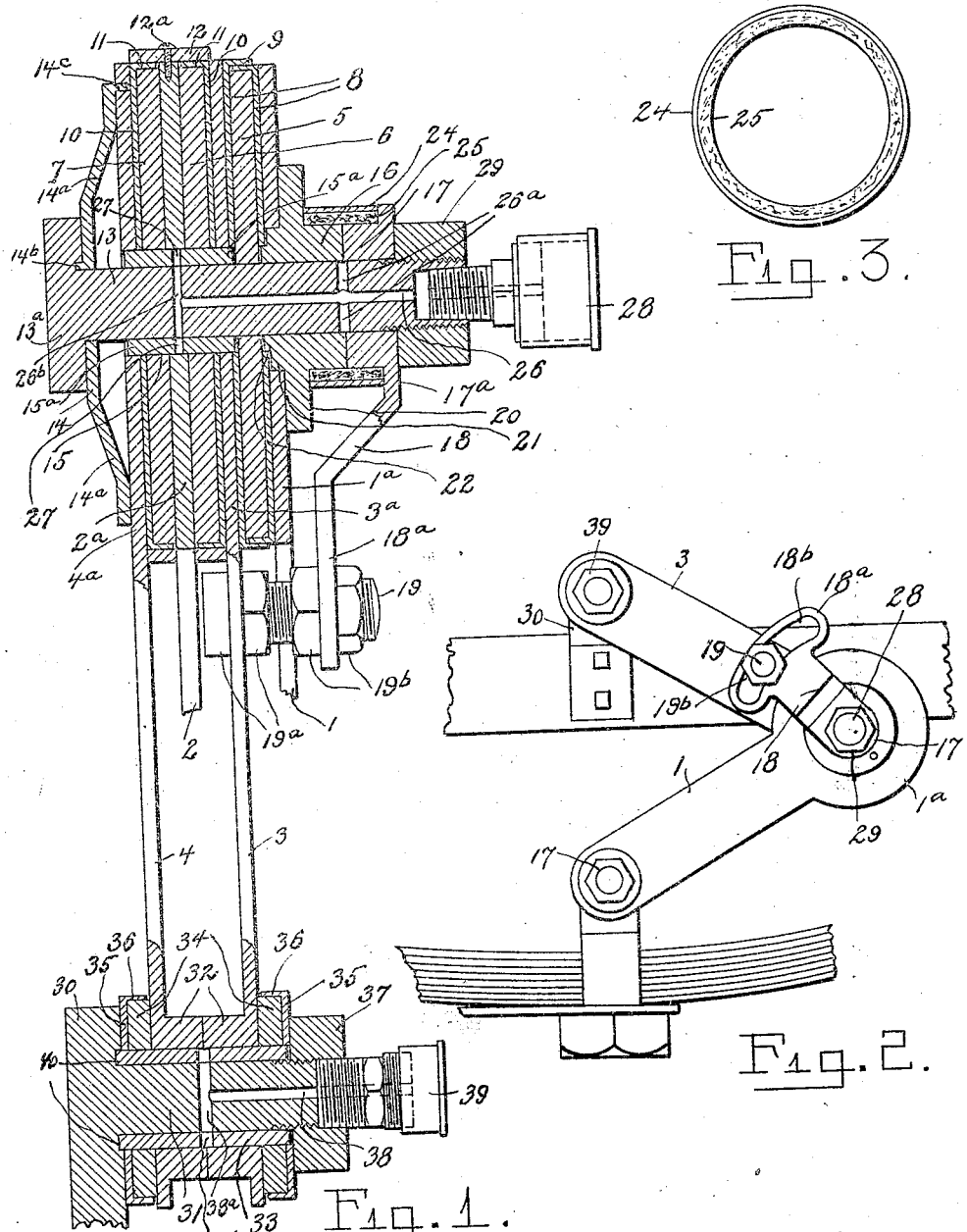

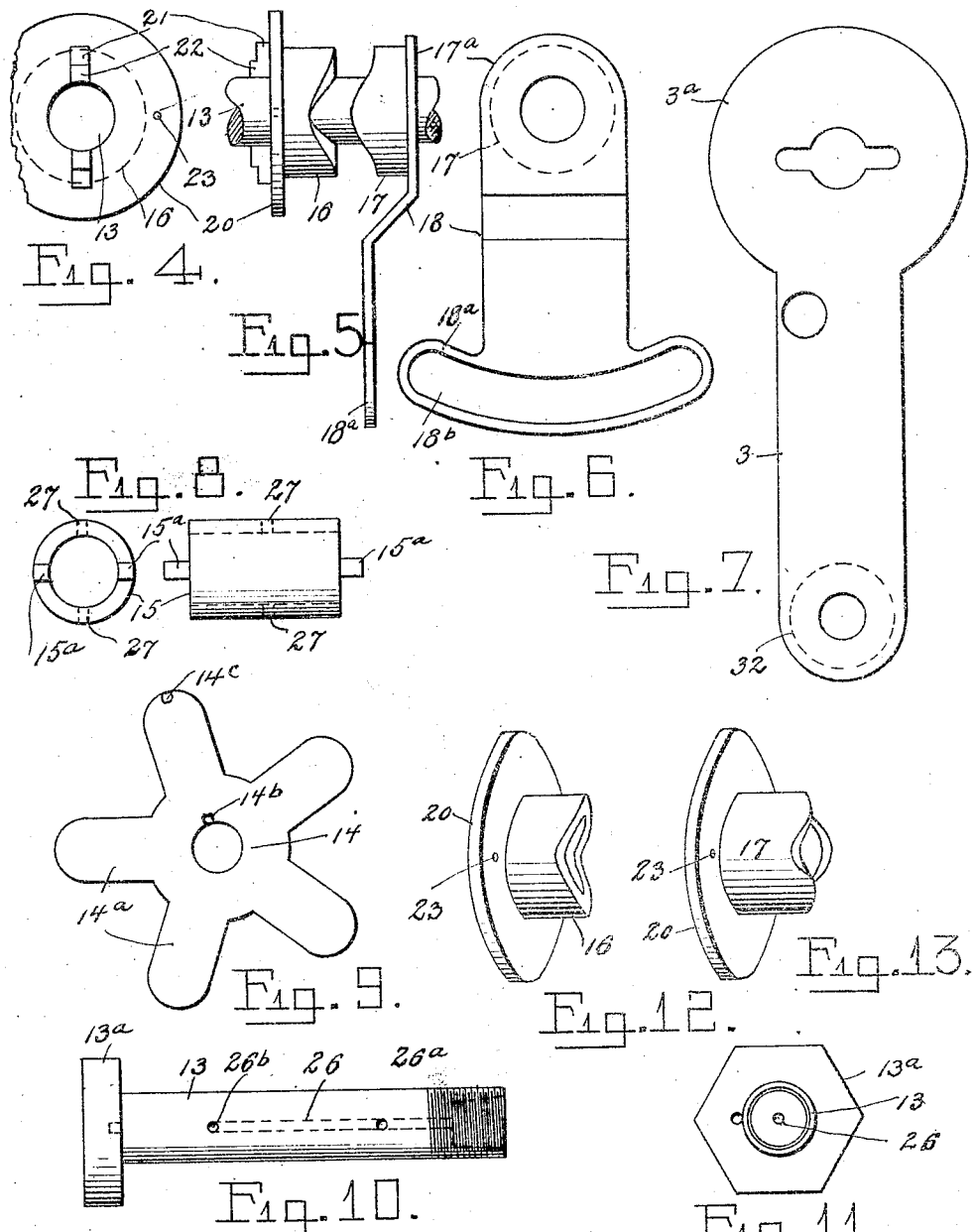

GEORGE C. BECK, OF SPOKANE, WASHINGTON.

SHOCK-ABSORBER.

1,080,745.  Specification of Letters Patent.  Patented Dec. 9, 1913.

Application filed January 28, 1913. Serial No. 744,660.

*To all whom it may concern:*

Be it known that I, GEORGE C. BECK, a citizen of the United States, residing at Spokane, in the county of Spokane and State of Washington, have invented certain new and useful Improvements in Shock-Absorbers, of which the following is a specification.

This invention relates to devices used in connection with the supporting springs of vehicles for preventing excessive vibration or bounding of the vehicle body, and more particularly that type of devices comprising two pivotally connected members having friction means at their joint for resisting relative movement of the members, one of which latter is connected to the body of the vehicle and the other to the running gear.

It is the object of the present invention to provide novel and improved means whereby the resistance is automatically increased in direct proportion to the amplitude of the vibrations of the vehicle body, so that the greater the bound, the greater will be the force tending to resist the same. This object is attained by the construction illustrated in the accompanying drawings, and described in detail hereinafter.

Figure 1 is an edge view of the device, partly in section, the sections being taken through the pivotal connection between the two members of the device, and the pivotal connection of the upper one of said members with the running gear of the vehicle. Fig. 2 shows the device in position on the car. Fig. 3 is an elevation of a dust guard. Fig. 4 is a face view of one of the cam members. Fig. 5 is an elevation of both cam members showing the same separated. Fig. 6 is a face view of the other cam member. Fig. 7 is an elevation of one of the supporting members of the device. Fig. 8 is an end view and an elevation of a bushing. Fig. 9 is an elevation of a spring. Fig. 10 is an elevation of a pivot bolt, and Fig. 11 is an end view thereof. Fig. 12 is a perspective view of the first-mentioned cam member. Fig. 13 is a perspective view showing a slight modification of said cam member.

As shown in the drawings, the device comprises two pivotally connected supporting members one of which is connected to the running gear and the other to the body of the vehicle. Each member is composed of two parallel arms, the arms of one member being indicated by the reference characters 1 and 2, respectively, and the arms of the other member by the reference characters 3 and 4, respectively. At the pivotally connected ends of the two members, the arms thereof have disk-like enlargements, indicated at $1^a$, $2^a$, $3^a$ and $4^a$, respectively. The arms are all spaced laterally and arranged in alternate order, the arm 2 being between the arms 3 and 4, and between the enlargements thereof are located wood or fiber friction disks 5, 6 and 7. On the faces of the friction disk 5 are metal wear plates 8 having inturned marginal flanges 9 which overlap on the periphery of said disk, as shown in Fig. 1. The outer faces of the friction disks 6 and 7 are provided with metal wear plates 10 having inturned marginal flanges 11 engaging, respectively, the peripheries of said disks. The flanges 11 are encircled by a ring 12 which overlaps the same and the edge of the part $2^a$ of the arm 2, said ring being secured to the part $2^a$ by a screw $12^a$. This arrangement of flanges and ring serves to exclude dust and dirt from the friction surfaces. The pivotal connection between the two members is made by a bolt 13 which passes through the center of enlarged ends thereof. The head $13^a$ of the bolt is spaced from the outer face of the enlargement $4^a$ of the arm 4, and between said parts is interposed a spring comprising a central disk-shaped portion 14 from which radiate spring-fingers $14^a$, the former fitting against the base of the bolt head and the latter engaging the outer face of the part $4^a$. This spring serves to press firmly together the parts which are pivoted together by the bolt 13, and the friction members therebetween, and jams the same together. The part 14 has a lug $14^b$ which seats in a recess in the base of the bolt head, and one of the fingers $14^a$ has a lug $14^c$ which seats in a recess in the face of the part $4^a$.

In the bolt hole of the friction disks 6 and 7 and the part $2^a$ of the arm 2 is a bushing 15 through which the bolt 13 passes. This bushing has end lugs $15^a$ which seat in recesses in the parts $3^a$ and $4^a$; and in the plate 8 contiguous to the part $3^a$.

The pivot-bolt 13 projects from the face of the part $1^a$ of the arm 1 and on said projecting portion of the bolt are mounted means for increasing the frictional contact between the parts $1^a$, $2^a$, $3^a$ and $4^a$ and the parts located therebetween, said parts being pressed together by the spring-member 14, 14ᵃ, as hereinbefore described, so that a resistance is offered to the free movement of said parts with respect to each other. These means for increasing the friction comprise two contiguous cam members 16 and 17, respectively, of any suitable diameter, having central openings through which the pivot-bolt passes. The cam surfaces are on the contiguous ends of the members. The member 17 has an outstanding peripheral flange 17ᵃ and a projecting arm 18 terminating in an enlargement 18ᵃ having an arcuate slot 18ᵇ. The arm 3 carries a bolt 19, the same being secured by nuts 19ᵃ and passing through the slot 18ᵇ. Nuts 19ᵇ screwed on the bolt against opposite sides of the enlargement 18ᵃ secure the arm 18 to the arm 3. It will therefore be evident that a rotary motion is given the cam member 17 when the arm 3 vibrates in response to the motion of the vehicle body.

The inner end of the cam member 16 has an outstanding peripheral flange 20 which abuts against the outer face of the part 1ᵃ, and said end of the cam member also has diametrically opposite lugs which are stepped to form two parts 21 and 22, respectively. The part 1ᵃ has a central opening through which the pivot-bolt 13 loosely passes, and the wall of said opening is notched at diametrically opposite points to receive the lugs 21. Thus, the cam member 16 is coupled to the arm 1. An additional fastening may be provided, which can be rivets, the flange 20 having apertures 23 for this purpose. The plate 8 which is between the friction disk 5 and the part 1ᵃ is coupled to the cam member 16 by the parts 22 entering notches thereof in the same manner as the parts 21.

The two cam members 16 and 17 are encircled by a dust-excluding shell 24 and a felt ring 25 inclosed by the latter, to prevent dust and grit from getting between the contacting cam surfaces of said cam members.

The pivot-bolt 13 has a central longitudinal lubricant duct 26 provided with lateral branches 26ᵃ which lead to the contacting cam surfaces of the cam members 16 and 17. The duct also has lateral branches 26ᵇ which register with apertures 27 in the bushing 15, which apertures 27 in turn open into the central aperture of the part 2ᵃ through which the bushing passes. The outer end of the duct is enlarged and into the same is screwed an oil cup 28. By the arrangement of the lubricant duct 26 and its branches herein described, the cam surfaces and the part 2ᵃ may be kept properly lubricated at all times.

The pivot-bolt 13 projects from the cam member 17 and on said projecting end, and against the cam member is screwed a nut 29 for retaining the pivot-bolt in place, and for varying the jamming action of the spring-member 14, 14ᵃ.

The lugs 14ᵇ and 14ᶜ engaging the parts 13ᵃ and 4ᵃ prevent the bolt 13 from turning while adjusting the nut 29, whereby the duct branches 26ᵇ are prevented from getting out of registry with the apertures 27.

The cam members 16 and 17 serve to increase the friction in direct proportion to the amplitude of the vibrations of the vehicle body. When the highest portions of the cam surfaces of one member seat in the lowest portions of the cam surface of the other member, the spring-member 14, 14ᵃ exerts its minimum influence to jam the parts together. When relative movement of the arms 1, 2 and 3, 4 takes place, the cam surfaces mount each other, which jams the parts 1ᵃ, 2ᵃ, 3ᵃ and 4ᵃ, and the friction members therebetween, together, so that the friction and the consequent resistance to the turning movement is increased, the resistance increasing until the highest portions of one cam surface engage the highest portions of the other, at which time a maximum resistance is offered. When the cam surfaces move in the opposite direction the resistance decreases until the minimum is reached as the highest portions again seat in the lowest portions. Thus the friction increases as the strokes get longer and the bumps harder. This makes an easy riding car and lighter springs can be used without danger of breakage. Slight vibrations of the car are taken care of by the car springs. The slot 18ᵇ allows adjustment of the cam member 17 to obtain the position of minimum friction with a certain desired load in the car when it is at a standstill or running slowly, irrespective of the distance between the points of attachment of the device. Adjustment may also be made so that a greater friction is obtained on the upward bound than on the downward bound, or vice versa; or adjustment may be made so that the friction is equal on both bounds. The arm 2 turns on the bushing 15, and the cam member 16 on the pivot-bolt 13. The cam member 16, the plate 8 contiguous to the part 1ᵃ, and the ring 12 turn with the parts 1ᵃ and 2ᵃ, and the parts connected to the parts 3ᵃ and 4ᵃ turn therewith. The friction disks 5, 6 and 7 and the parts 24 and 25 are free to turn in either direction, irrespective of the movement of the other parts.

A bracket 30 mounted on the vehicle body carries a pivot-stud 31 for the outer ends of the arms 3 and 4, said ends being formed with hubs 32, the inner ends of which latter are in contact with each other. The bores of the hubs contain a bushing 33 through which the pivot-stud passes. In contact with the outer end of each hub is a friction disk 34 provided with a wear plate 35 and dust-excluding means 36 similar to the parts 10 and 11 hereinbefore described. The bushing projects from the hubs and passes through central apertures in the parts 34 and 35. On the outer end of the pivot-stud 31 is screwed a nut 37 for retaining the parts in place and regulating the friction. This nut is screwed against the plate 35 of the outer friction disk 34. The plate 35 of the inner friction disk 34 abuts against the bracket 30. Thus, when the nut is tightened up, the parts 32, 34 and 35 are clamped together, and the friction produced therebetween offers a resistance to the free movement of the arms 3 and 4.

The pivot-stud 31 has a central longitudinal lubricant duct 38 provided with lateral branches 38$^a$ which register with apertures 38$^b$ in the bushing 33 so that the lubricant may flow to the contacting portions of the hubs 32. An oil cup 39 is screwed into the nut 37 and serves also as a lock-nut for the latter.

A connection similar to the one just described is provided between the arms 1 and 2, and the running gear of the vehicle.

The bushing 33 has end lugs 40 entering recesses in the bracket 30 whereby the bushing is prevented from turning to bring the duct branches out of registry with the apertures 38$^b$.

Various changes and modifications in the structural details may be made without a departure from the spirit and scope of the invention as hereinafter claimed. The lubricating means may be left off, if desired. The diameter of the cam members 16 and 17 may be varied to meet different conditions or requirements. Figs. 5 and 12 show a two-point cam. A three-point cam is shown in Fig. 13. Either form of cam may be employed.

I claim:

1. A shock-absorber comprising a pair of supporting members each comprising two spaced parallel arms, said arms being arranged in alternate order, a bolt pivotally connecting said supporting members, a spring interposed between the bolt-head and the adjacent outer arm of one of the supporting members, the bolt projecting from the outer arm of the other supporting member, a cam mounted on the projecting end of the bolt and coupled to the last-mentioned arm, a second cam mounted on the bolt in contact with the other cam, an arm extending from the second-mentioned cam and adjustably connected to the other arm of the first-mentioned supporting member, a nut screwed on the bolt against the second-mentioned cam, and friction members interposed between the arms of the supporting members at the pivot joint.

2. A shock-absorber comprising a pair of supporting members each comprising two spaced parallel arms, said arms being arranged in alternate order, a bolt pivotally connecting said supporting members, a bushing on the bolt, said bushing passing loosely through one of the arms of one of the supporting members and the bolt passing loosely through the other arm of said member, means for coupling the bushing to the arms of the other supporting member, a spring interposed between the head of the bolt and the outer one of the last-mentioned arms, said spring being coupled to said arm and to the bolt-head, a nut screwed on the bolt, said bolt having a lubricant duct provided with a lateral branch, and the bushing having an aperture registering with said branch, the aperture opening to the arm through which the bushing loosely passes, a cam on the bolt and coupled to the arm through which the bolt loosely passes, a second cam on the bolt in contact with the other cam, an arm extending from the second-mentioned cam and adjustably connected to one of the arms to which the aforesaid bushing is coupled, the aforesaid nut being screwed on the bolt against the second-mentioned cam, and friction members interposed between the arms of the supporting members at the pivot joint.

3. A shock-absorber comprising a pair of supporting members each comprising two spaced parallel arms, said arms being arranged in alternate order, a bolt pivotally connecting said supporting members, a spring interposed between the bolt-head and the adjacent outer arm of one of the supporting members, the bolt projecting from the outer arm of the other supporting member, a cam mounted on the projecting end of the bolt and coupled to the last-mentioned arm, a second cam mounted on the bolt in contact with the other cam, an arm extending from the second-mentioned cam and adjustably connected to the other arm of the first-mentioned supporting member, a nut screwed on the bolt against the second-mentioned cam, friction members interposed between the arms of the supporting members at the pivot joint, and wear plates on opposite sides of the friction members, said plates having inturned marginal flanges overlapping the peripheries of the friction members.

4. A shock-absorber comprising a pair of supporting members each comprising two spaced parallel arms, said arms being arranged in alternate order, a bolt pivotally connecting said supporting members, a spring interposed between the bolt-head and the adjacent outer arm of one of the supporting members, the bolt projecting from the outer arm of the other supporting member, a cam mounted on the projecting end of the bolt and coupled to the last-mentioned arm, a second cam mounted on the bolt in contact with the other cam, an arm extending from the second-mentioned cam and adjustably connected to the other arm of the first-mentioned supporting member, a nut screwed on the bolt against the second-mentioned cam, friction members interposed between the arms of the supporting members at the pivot joint, wear plates on opposite sides of the friction members, said plates having inturned marginal flanges overlapping the peripheries of the friction members, the flanges of the wear plates of one of the friction members overlapping each other, and a ring covering the flanges of the other wear plates.

In testimony whereof I affix my signature in presence of two witnesses.

GEORGE C. BECK.

Witnesses:
W. B. CHANDLER,
M. R. SMITH.